United States Patent
Wang

(10) Patent No.: US 12,481,067 B2
(45) Date of Patent: Nov. 25, 2025

(54) GLOBAL NAVIGATION SATELLITE SYSTEM STATE SPACE REPRESENTATION CORRECTION FORWARDING SERVICE

(71) Applicant: QUALCOMM Incorporated, San Diego, CA (US)

(72) Inventor: Min Wang, Tustin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 18/299,247

(22) Filed: Apr. 12, 2023

(65) Prior Publication Data

US 2024/0345255 A1 Oct. 17, 2024

(51) Int. Cl.
*G01S 19/07* (2010.01)
*G01S 19/08* (2010.01)

(52) U.S. Cl.
CPC .............. *G01S 19/07* (2013.01); *G01S 19/08* (2013.01)

(58) Field of Classification Search
CPC combination set(s) only.
See application file for complete search history.

(56) References Cited

U.S. PATENT DOCUMENTS

| | | | |
|---|---|---|---|
| 2014/0062776 A1* | 3/2014 | Ferguson | G01S 19/03 342/357.41 |
| 2023/0292285 A1* | 9/2023 | Lee | H04W 68/02 |

FOREIGN PATENT DOCUMENTS

| | | | | |
|---|---|---|---|---|
| CN | 111831965 A | * | 10/2020 | ............ G06F 17/18 |
| CN | 113176590 B | | 4/2023 | |
| EP | 3159714 B1 | * | 9/2020 | ........... G01S 19/072 |

OTHER PUBLICATIONS

International Search Report and Written Opinion—PCT/US2024/016990—ISA/EPO—Oct. 15, 2024.
Donguk K., et al., "Preliminary Test Results of Compact Wide-area Rtk: a New Satellite-based Augmentation System for Centimeter-level Service", GNSS 2019—Proceedings of the 32nd INternational Technical Meeting of the Satellite Division of the Institute of Navigation (ION GNSS+ 2019), The Institute of Navigation, 8551 Rixlew Lane Suite 360 Manassas, VA 20109, USA, Sep. 20, 2019, pp. 3708-3716, XP056015576, figure 1 sections, Introduction, Compact Wide-Area RTK System.
Partial International Search Report—PCT/US2024/016990—ISA/EPO—Jul. 2, 2024.

* cited by examiner

*Primary Examiner* — Vladimir Magloire
*Assistant Examiner* — Eric K Hodac
(74) *Attorney, Agent, or Firm* — QUALCOMM Incorporated

(57) ABSTRACT

Techniques are for providing satellite navigation correction information to mobile devices are described herein. An example of a method for providing Global Navigation Satellite System (GNSS) State Space Representation (SSR) correction information includes receiving SSR correction information, generating enhanced SSR correction information by performing at least one of a quality verification process, a coordinate transformation process, or an Issue of Data Ephemeris (IODE) dependency removal process on the received SSR correction information, and providing the enhanced SSR correction information to one or more mobile devices.

24 Claims, 12 Drawing Sheets

GLOBAL NAVIGATION SATELLITE SYSTEM STATE SPACE REPRESENTATION CORRECTION FORWARDING SERVICE

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, consumer asset tracking, locating a friend or family member, etc. Existing positioning methods include methods based on measuring radio signals transmitted from a variety of devices including satellite vehicles and terrestrial radio sources in a wireless network such as base stations and access points. Several Global Navigation Satellite Systems (GNSS) provide high accuracy location services that provide corrections to sources of location measurement error, such as BeiDou's BDS B2B PPP (precise point positioning) corrections and Galileo's HAS (high accuracy service) corrections. These services may be difficult for a user device to decode, may be on unsupported frequency bands, and may have other impediments to their widespread usefulness.

SUMMARY

An example of a method for providing Global Navigation Satellite System (GNSS) State Space Representation (SSR) correction information according to the disclosure includes receiving SSR correction information, generating enhanced SSR correction information by performing at least one of a quality verification process, a coordinate transformation process, or an Issue of Data Ephemeris (IODE) dependency removal process on the received SSR correction information, and providing the enhanced SSR correction information to one or more mobile devices.

Implementations of such a method may include one or more of the following features. The SSR correction information may be received from a stationary monitor station configured to receive the SSR correction information from one or more satellite vehicles. The SSR correction information may include a computed clock value, orbit information, an indication of an associated IODE value, or combinations thereof. The enhanced SSR correction information may include a rounded computed clock value based on a rounding down of the computed clock value to an integer value, and a clock correction value that is not dependent on a IODE. The SSR correction information may include one or more orbit correction components based on a radial, along-track, and cross-track coordinate system. The enhanced SSR correction information may include Cartesian coordinate for the one or more orbit correction components. The quality verification process may include determining a carrier phase residual measurement associated with orbit information and clock information included in the SSR correction information. The quality verification process may include excluding the orbit information and the clock information from the enhanced SSR correction information based at least in part on the carrier phase residual measurement. Providing the enhanced SSR correction information to a mobile device may be based at least in part on a subscription service associated with the mobile device.

An example of an apparatus according to the disclosure includes a memory, at least one transceiver, at least one processor communicatively coupled to the memory and the at least one transceiver, and configured to receive Global Navigation Satellite System (GNSS) State Space Representation (SSR) correction information, generate enhanced SSR correction information by performing at least one of a quality verification process, a coordinate transformation process, or an Issue of Data Ephemeris (IODE) dependency removal process on the received SSR correction information, and provide the enhanced SSR correction information to one or more mobile devices.

Items and/or techniques described herein may provide one or more of the following capabilities, as well as other capabilities not mentioned. A cloud server may be configured to receive State Space Representation (SSR) correction information for a GNSS constellation and forward decoded and pre-processed SSR correction information to subscribing mobile devices. The server may be configured to perform processing functions to enhance SSR correction information. The enhanced SSR correction information may reduce the processing requirements on the subscribing mobile devices. The enhanced SSR correction information may be based on a validation process performed by the server. Validated correction information may be forwarded to the mobile devices. The server may be configured to perform other data operations, such as coordinate transformations and data normalization to enhance the SSR correction information. In an example the dependence on the ephemeris data issue date (e.g., IODE) may be removed to enable a mobile device to apply the correction information regardless of the IODE reference. The enhanced SSR correction information may reduce the processing requirements of a mobile device and may improve the accuracy of position estimates computed by the mobile device. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Figure 1:
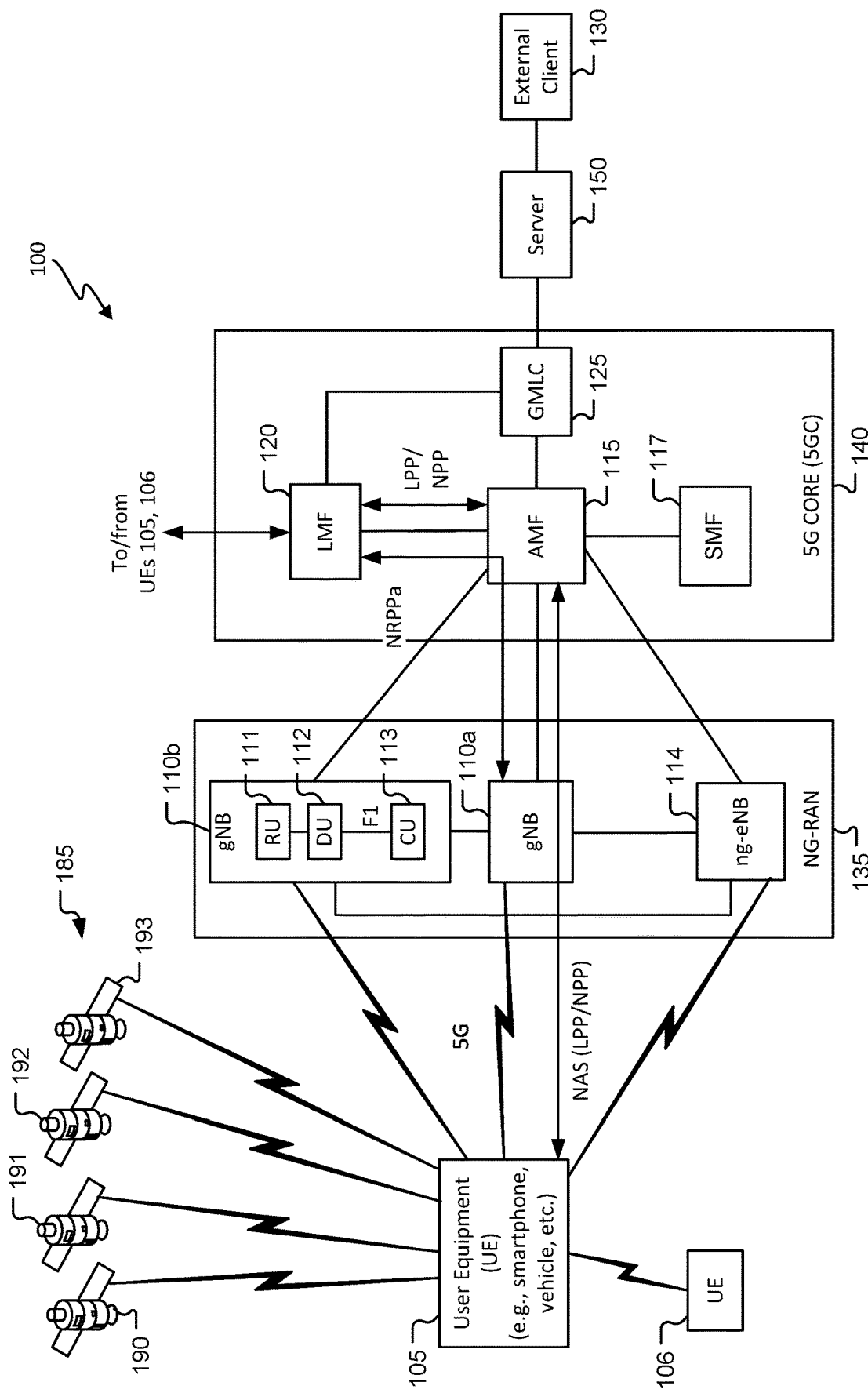
FIG. 1 is a simplified diagram of an example wireless communications system.

Techniques are discussed herein for providing satellite navigation correction information to mobile devices. Some GNSS constellations may be configured to provide State Space Representation (SSR) Precise Positioning Engine (PPE) correction information. For example, the BDS B2B PPP correction information may be transmitted on a B2B band on a central frequency of 1207.14 MHz, with 118 f0, where f0=10.23 MHz. The corresponding data symbol rate may be approximately 1000 symbols/sec (SPS) (e.g., each symbol in 1 ms). The GAL HAS correction information may be transmitted on the E6 band on a central frequency of 1278.75 MHz, with a 125 f0) and a corresponding data symbol rate of 1000 SPS. The implementation of the SSR PPE corrections may have a substantial impact on the position estimates generated by a GNSS receiver. In an example, the SSR PPE corrections may reduce the orbit radial component error to less than 10 cm, and they may enable the receiver to realize centimeter level accuracy after measurement convergence. These improvements, however, may not be available to some reduced capability mobile devices due to the limitations on processing power. For example, a mobile device may not have the processing capabilities to decode the SSR PPE corrections transmitted from the GNSS satellite vehicles (SVs). A mobile device may have limited antenna configurations and may struggle to reliably decode data symbols from GNSS signals with a low carrier to noise ratio (CN0). Further, some mobile devices may not support the frequency band(s) that the SSR PPE correction information is transmitted on (e.g., GAL E6 band). The techniques provided herein may be implemented to overcome these limitations to enable a mobile device to receive and utilize SSR PPE correction information.

As described herein, a monitoring station may be configured to monitor a GNSS constellation for SSR PPE correction information and provide decoded and pre-processed SSR information to subscribing mobile devices. The monitoring station may be configured to perform processing functions on the SSR correction information to enhance the SSR correction information, which may reduce the processing requirements on the subscribing mobile devices. The enhanced SSR correction information may include additional information, transformations of the correction information, and/or verification of the correction information. In an example, the monitoring station (or other networked server) may be configured to validate and verify the SSR correction information prior to providing it to the mobile devices. Other data operations, such as coordinate transformations and data normalization may also be performed on the SSR correction information by the monitoring station, or other networked resource. For example, the dependence on the ephemeris data issue date (e.g., IODE) may be removed to enable a mobile device to apply the correction information regardless of the IODE reference.

In operation, in an example, a reference station may be configured to decode PPE SSR corrections from GNSS SVs and forward the decoded corrections through a cloud service to a mobile device, and the mobile device may be configured to utilize the decoded SSR PPE in performing a fix. In an example, the cloud service may be configured to verify the SSR correction quality by using pre-surveyed monitor stations that collect GNSS measurements and the SSR correction. Verification may be realized by utilizing the carrier phase residual to verify orbit/clock quality. If verified, the SSR correction information may be provided to mobile devices, otherwise the SSR correction information may be withheld from the mobile devices (e.g., removed from information being provided to the mobile devices). In an example, the cloud service may be configured to translate Bediou PPP corrections from radial, along, cross track components into an XYZ frame, and then forward the translated corrections to the mobile devices. In some implementations, SSR corrections may be assumed to have correct values, but this assumption may be incorrect with variations in the ephemeris IODE (e.g., the different IODE may lead to errors in the fix generated by the mobile device). In an example, the cloud service may be configured to generate correction information which may be applied to various broadcast ephemeris data with different IODE values. These techniques are examples only, and not exhaustive.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, on-board unit (OBU), etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," "a wireless node," a "subscriber device," a "subscriber terminal," a "subscriber station," a "user terminal" or UT, a "mobile terminal," a "mobile station," a "mobile device," or variations thereof. A UE disposed in a vehicle may be called an on-board unit (OBU). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC), Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA)

for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the UE's position.

Figure 2:
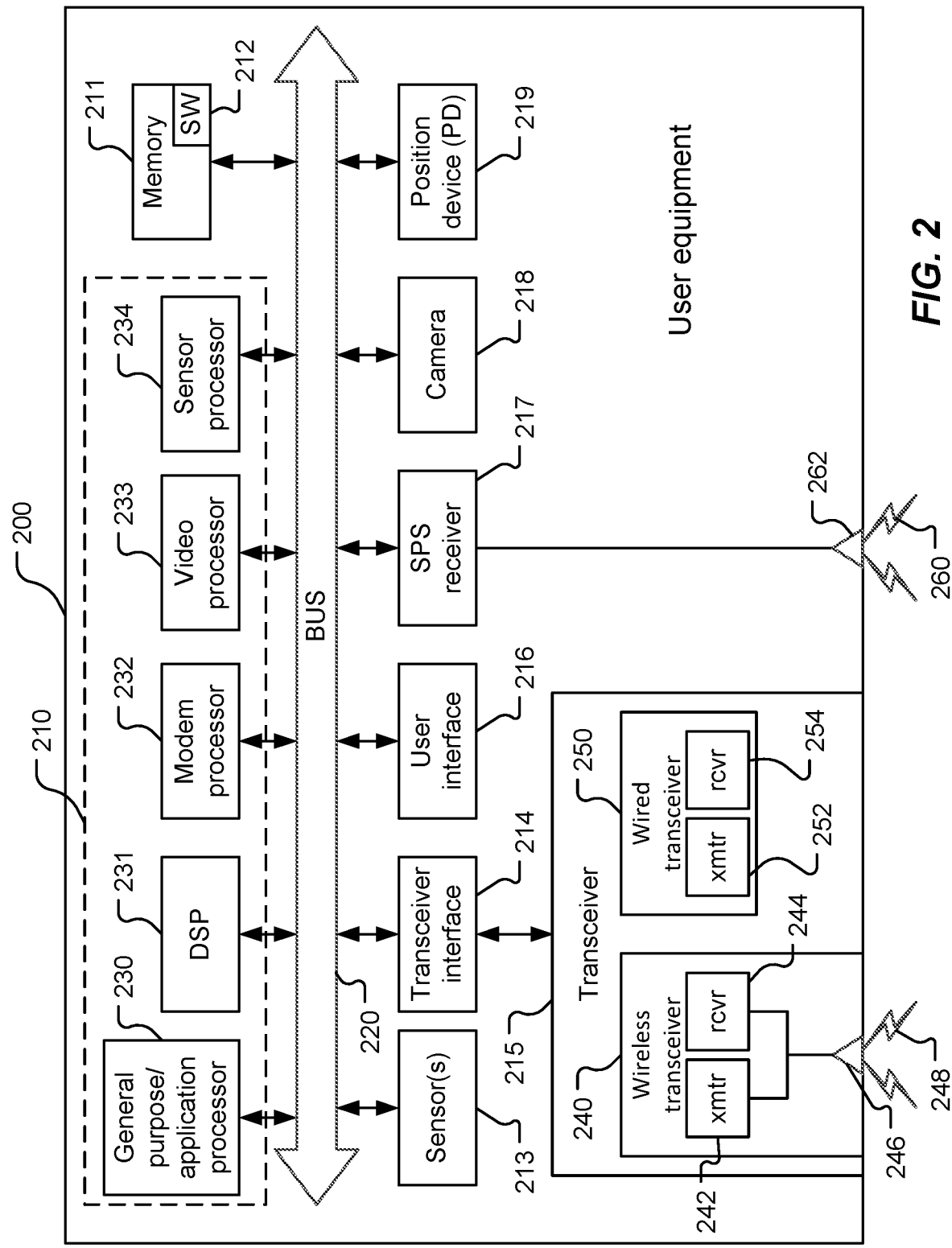
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), UltraWideBand (UWB), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/ integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
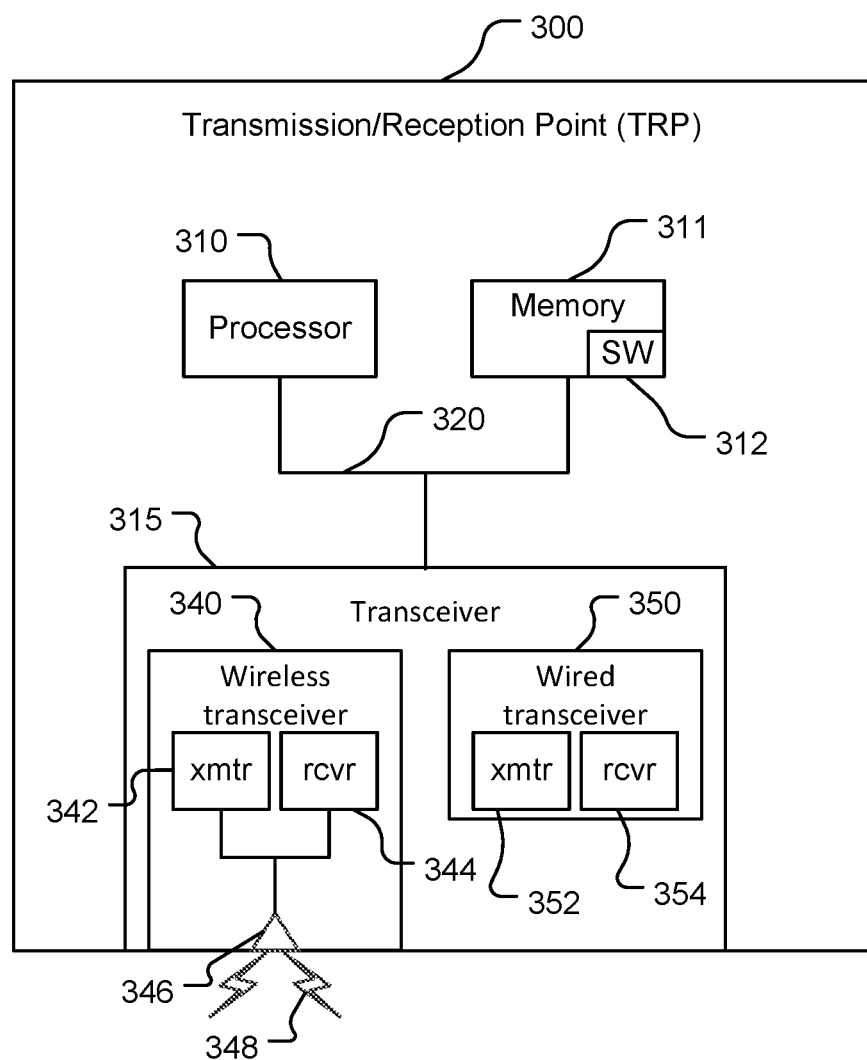
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), UWB, Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions). In an example, a RSU may include some or all of the components of a TRP 300. The TRP 300 may be an example of a wireless node in a communications network.

Figure 4:
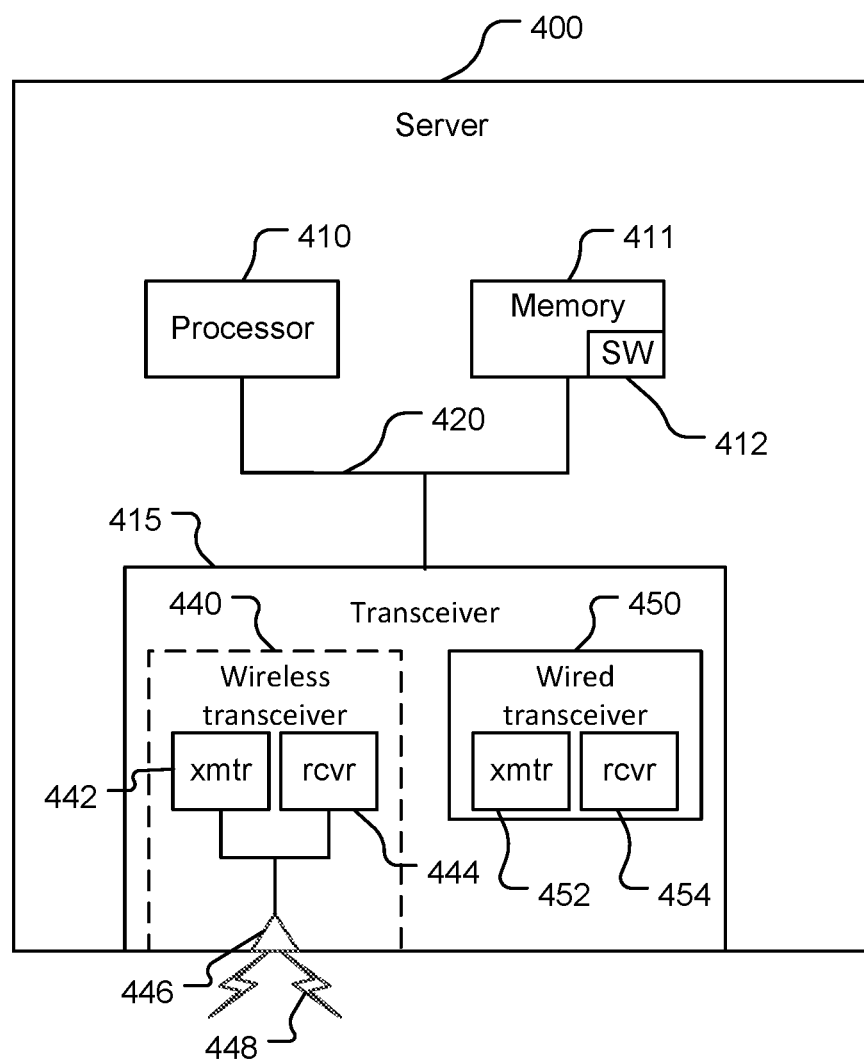
FIG. 4 is a block diagram of components of a server.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), UWB, Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Figure 5:
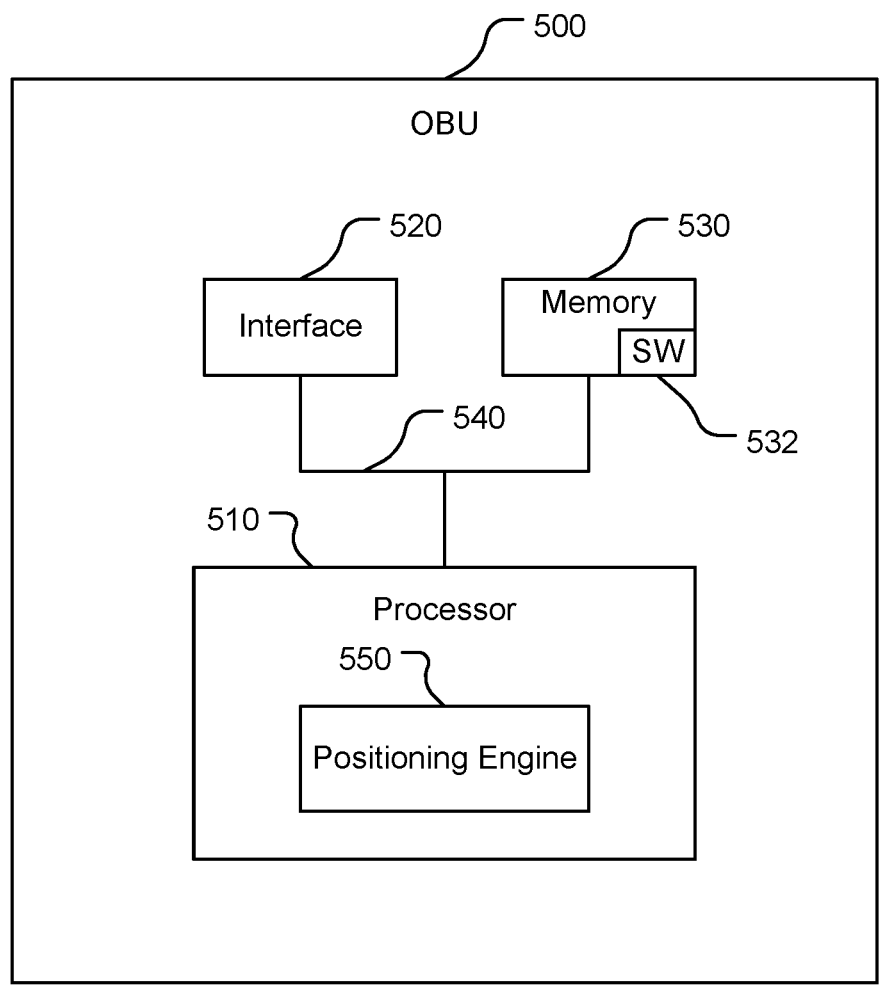
FIG. 5 is a block diagram of an example On Board Unit (OBU) with a positioning engine.

Referring to FIG. 5, with further reference to FIGS. 1-4, an OBU 500 (on-board unit) includes a processor 510, an interface 520, and a memory 530 communicatively coupled to each other by a bus 540. The OBU 500 may include some or all of the components shown in FIG. 5, and may include one or more other components such as any of those shown in FIG. 2, and/or may communicate with one or more other devices (via the interface 520) with one or more features of the UE 200 (e.g., an IMU, a camera, sensors, etc.). The OBU 500 is an example of a wireless node. The processor 510 may include one or more components of the processor 210. The interface 520 is configured to transmit and receive V2X signals, e.g., C-V2X signals (i.e., signals of a C-V2X format, e.g., for communication). The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the SPS antenna 262. The memory 530 may be configured similarly to the memory 211, e.g., including software 532 with processor-readable instructions configured to cause the processor 510 to perform functions. The OBU 500 may be a UE, such as the UE 200, that is also configured to communicate using C-V2X technology.

The description herein may refer to the processor 510 performing a function, but this includes other implementations such as where the processor 510 executes software (stored in the memory 530) and/or firmware. The description herein may refer to the OBU 500 performing a function as shorthand for one or more appropriate components (e.g., the processor 510 and the memory 530) of the OBU 500 performing the function. The processor 510 (possibly in conjunction with the memory 530 and, as appropriate, the interface 520) includes an positioning engine 550. The positioning engine 550 may include the processing capabilities and instructions to perform the satellite and terrestrial computations for the techniques described herein.

Figure 6:
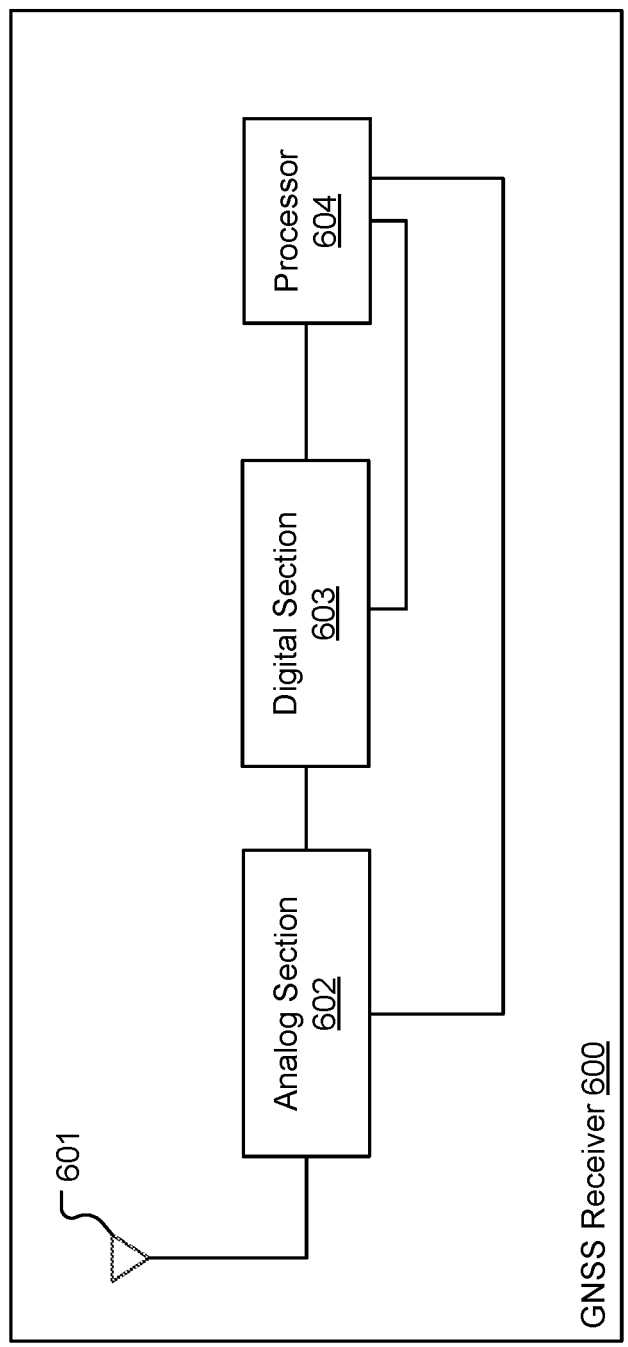
FIG. 6 is a block diagram of an example GNSS receiver.

Referring to FIG. 6, a diagram of an example GNSS receiver 600 is shown. The SPS receiver 217 in the UE 200, and the interface 520 in the OBU 500, may include one or more components of the GNSS receiver 600 and thus may be examples of the GNSS receiver 600. In an example, the Global Positioning System (GPS) is an example of a GNSS navigation system in which a receiver determines its position by precisely measuring the arrival time of signaling events received from multiple satellites. Each satellite transmits a navigation message containing the precise time when the message was transmitted and ephemeris information. Each sub-frame of the navigation message starts with a telemetry word (TLM) and the number of the sub-frame. The start of the sub-frame may be detected by means of a preamble sequence in the TLM. Each sub-frame also includes a handover word (HOW), which gives the exact time of the week (TOW) when the satellite will transmit the next sub-frame according to the local version of GPS time held by the satellite's clock. The ephemeris information includes details about the satellite's orbit and corrections for the satellite's own clock, in comparison with GPS time. The ephemeris and clock correction parameters may collectively be known as ephemeris information.

GPS signals are formed of a navigation message binary phase shift modulated (BPSK) onto a direct sequence spread spectrum signal. The spread spectrum signal comprises a unique pseudo-noise (PN) code that identifies the satellite. For civil application GPS signals transmitted using the L1 frequency, this code is known as the C/A code. The C/A code has a sequence length of 1023 chips and it is spread with a 1.023 MHz chipping rate. The code sequence therefore repeats every millisecond. The code sequence has an identified start instant when the two code generators in the satellite just transition to the all '1's' state. This instant is known as the code epoch. After various transport delays in the satellite, the code epoch is broadcast through the timing and sequence of specific code states assigned to the satellite. This signaling event can be recognized, in suitably adapted receivers, through a process of aligning a replica code with the code received from each satellite.

The navigation message has a data rate of 50 bits per second, lower than the code rate, and its data bit or symbol transitions are synchronized with the start of the C/A code sequence. Each bit of the navigation message lasts for 20 milliseconds and thus incorporates 20 repetitions of the C/A code. The navigation message is constructed from a 1500-bit frame consisting of five 300-bit sub-frames. Each sub-frame lasts for 6 seconds. The satellite transmits the navigation message and C/A code using a carrier frequency that is an integer multiple of 10.23 MHz (for the L1 carrier, the multiple is 154).

In addition to the time and ephemeris information, the data message also contains the satellite constellation almanac, parameters representing the ionospheric and tropospheric delay, health parameters and other information used by some receivers. There are 25 different frames of data broadcast from each satellite. Each frame contains identical information (apart from time) in sub-frames 1-3 inclusive but cycles through a pre-assigned sequence of data in sub-frames 4 and 5, which contain almanac and other information. The ephemeris information, including the satellite clock biases, is periodically refreshed by the GPS Control Segment, typically every 2 hours, so that the navigation data message is representative of the orbit and status of each satellite. There are indicators in the navigation message which provide the user with knowledge of when the ephemeris and clock data has been changed. Details of these changes are set out in the GPS interface standard, IS GPS 200.

The GNSS receiver 600 may be a GPS receiver, and may be configured to determine the time-of-arrival of a signaling event through a process of aligning a replica code with the code received from each satellite. The receiver may also use the TOW information contained in the navigation message to determine the time when the signaling event was transmitted. From this, the receiver can determine the transit time for the signaling event (from which it can determine the distance between it and the satellite), together with the position of the satellite at the time when the signaling event was transmitted (using the ephemeris information). The receiver can then calculate its own position. Theoretically, the position of the GPS receiver can be determined using signals from three satellites, provided the receiver has a precise time or knowledge of part of the positions, such as altitude. However, in practice GPS receivers use signals from four or more satellites to determine an accurate three-dimensional location solution because an offset between the receiver clock and GPS time introduces an additional unknown into the calculation.

If the satellite signal reception is poor (commonly known as weak signal conditions), or if the receiver only receives a short burst of the signal, the receiver may not be able to decode the TOW information. Without this information, the GPS receiver may be unable to determine the distance between it and the satellite with sufficient accuracy because the receiver will not know the time when the signaling event was transmitted. Under weak signal conditions or briefly glimpsed signals, the receiver may also be unable to recognize the start of a sub-frame since it may not be able to decode the TLM.

A receiver that has been unable to decode the TLM and TOW information in the navigation message may nonetheless be able to deduce some timing information even under weak signal conditions or from briefly glimpsed signals. For example, the receiver may be able to determine a time shift between the satellite signal's spreading (PN) code and a locally generated version of the same, e.g. by correlating the received signal with a locally generated replica of the PN code or by using an equivalent signal processing technique. This time shift represents at least part of the transit time for the satellite signal. However, since both the PN code in the signal and the locally generated replica code are of finite length in space (known as the code wavelength), the correlation operation can only identify a part of the total time shift. This part of the total time shift represents a fractional part of the signal transit time between satellite and the receiver, measured in code repetition intervals. The integer number of code repetition intervals the signal took to travel between the satellite and the receiver cannot be measured by the receiver (e.g., integer ambiguity value).

GNSS accuracy may degrade significantly under weak signal conditions such as when the line-of-sight (LOS) to the satellite vehicles is obstructed by natural or manmade objects. In some cases, the weak signals may cause cycle slip and diminish the integer ambiguity resolution (IAR) in the GNSS receiver. Such errors may induce an absolute position error of the order of tens of meters (e.g. as much as 50 meters) and relative position error of the order several meters. In addition, accuracy may be further degraded by the limited availability of good GNSS measurements. For example, with GNSS measurements that use carrier phase to achieve higher accuracy, positioning accuracy is dependent on a constant lock.

In an example, the GNSS receiver 600 includes, without limitation, an antenna 601, an analog section 602, a digital section 603, and a processor 604. The antenna 262 on the UE 200 is an example of the antenna 601. GNSS satellite signals are received by the antenna 601 and are coupled to an input of the analog section 602. The analog section 602 is configured to process the GNSS satellite signals and produce a digital intermediate frequency (IF) signal by sampling the GNSS satellite signal with an analog to digital converter (ADC). In one embodiment, the sample rate may be approximately 83 mega-samples per second (Ms/s). The digital IF signal is coupled to the input of the digital section 603. The digital section 603 is configured to utilize the digital IF signal to acquire and track satellites from within the GNSS satellite constellation by producing acquisition and tracking data that is coupled to the processor 604. The processor 604 may be a central processing unit CPU, a microprocessor, a digital signal processor, or any other such device that may read and execute programming instructions. The processor 604 is configured to analyze the acquisition and tracking data to determine navigation information such as location and velocity. A satellite may transmit signals on a plurality of frequencies and the processor 604 may be configured to determine pseudorange and carrier-phase measurements based on GNSS models as known in the art.

Figure 7:
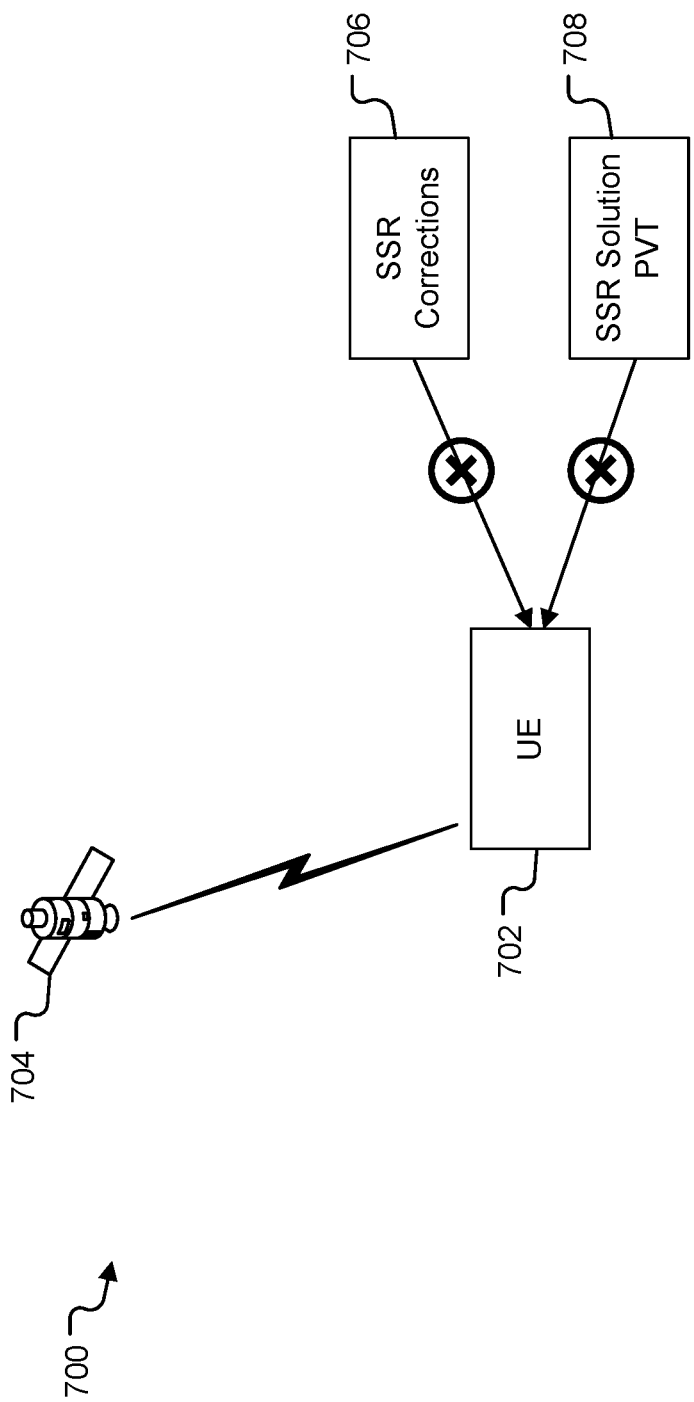
FIG. 7 is a block diagram of an example of a mobile device without State Space Representation (SSR) correction forwarding.

Referring to FIG. 7, an example of a system 700 without GNSS SSR (State Space Representation) correction forwarding is shown. A UE 702, which may be the same as the UE 200, receives location information from a GNSS satellite 704, for example via a GNSS receiver 600. In an example, a GNSS constellation may include one or more SVs configured to provide SSR correction information 706 and SSR solution information 708 (e.g., position, velocity and time information). The UE 702, however, may not be capable to receive or utilize (e.g., decode) the SSR correction and solution information 706, 708 because of hardware limitations. For example, the UE 702 may not have the processing capabilities to decode the SSR correction information 706 transmitted from the GNSS SVs, or the UE 702 may have a limited antenna configuration and cannot reliably decode data symbols due to a low CN0. The UE 702 may not support the frequency band(s) that the SSR correction and solution information 706, 708 is transmitted on (e.g., GAL E6 band). The SSR forwarding techniques described herein may be implemented to overcome the hardware limitations of the UE 702.

Figure 8:
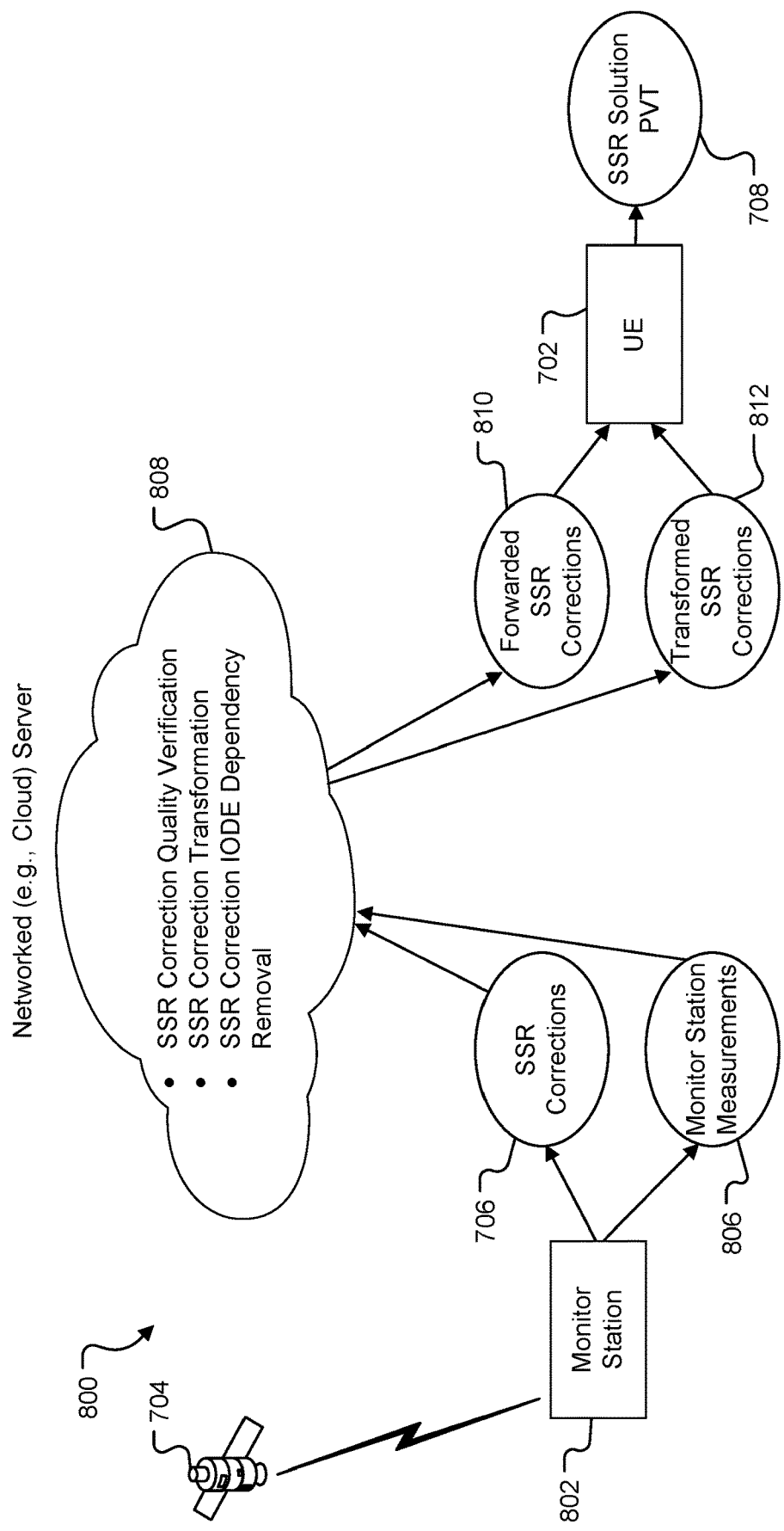
FIG. 8 is a block diagram of an example networked server configured for enhancing and forwarding SSR correction information to mobile devices.

Referring to FIG. 8, with further reference to FIG. 7, an example of a system 800 with GNSS SSR correction forwarding is shown. A monitor station 802 may include a server 400 and a GNSS receiver 600 configured to receive signals from SVs in a GNSS constellation, such as the GNSS satellite 704. The GNSS satellite 704 may be in a synchronous orbit, or medium orbit, or other orbit, and may be configured to provide SSR correction and other solution information to terrestrial stations. For example, the GNSS satellite 704 may be configured to transmit BDS B2B PPP correction information on a B2B band with a central frequency of 1207.14 MHz, and/or GAL HAS correction information on the E6 band. Other frequencies for other GNSS constellations may also be used. The SSR correction information provided by the GNSS satellite 704 may include the SSR corrections and solution information 706, 708 described in FIG. 7. The SSR information may include ephemeris information (e.g., and associated IODE information). The monitor station 802 may typically be located in a fixed and known location, and may be configured to provide the SSR correction information 706 and additional monitor station measurements 806 to a networked server 808. The monitor station measurements 806 may include GNSS-measured location information of the monitor station 802 and precise location information of the monitor station 802. The networked server 808 may be an edge computing device and/or communicatively coupled to a wide area network such as the Internet (e.g., a cloud server). In an example, the networked server 808 may include some or all of the components of the server 400, and may be communicatively coupled to the communication system 100. The networked server 808 may include a plurality of servers 400. The system 800 may include a plurality of monitor stations 802 configured to provide SSR information to the networked server 808. There may be one or more monitor stations 802 per satellite constellation.

The networked server 808 may be configured to perform a number of functions, including SSR correction quality verification, SSR correction transformation, and SSR correction IODE (Issue of Data Ephemeris) dependency removal. For example, the networked server 808 may be configured to verify the SSR correction quality by using pre-surveyed monitor stations configured to collect GNSS measurements and SSR correction information. The networked server 808 may be configured to utilize carrier phase residual information to verify orbit/clock quality. Verified SSR correction information may be provided to the UE 702 as forwarded SSR corrections 810. In an example, the networked server 808 may be configured to withhold non-verified SSR correction information from the UE 702 (e.g., remove the information from the forwarded SSR corrections 810). The networked server 808 may be configured to translate SSR Corrections (e.g., Bediou PPP corrections) from radial, along, cross track components into an XYZ frame, and then forward the translated corrections to the UE 702 as transformed SSR corrections 812. In an example, the networked server 808 may be configured to generate and forward the SSR corrections 810 which may be applied to various broadcast ephemeris data without a dependence on an IODE value. The networked server 808 may be configured as an external client 130 and/or server 150 and may utilize the communications system 100 to provide the forwarded SSR corrections 810 and/or the transformed SSR corrections 812 to the UE 702. The UE 702 may be configured to determine a SSR solution PVT 708 based at least on the received SSR correction information. While FIG. 8 depicts a single UE (e.g., the UE 702), multiple mobile devices may be configured to receive the forwarded SSR correction 810. For example, the OBU 500 may be configured with a GNSS receiver and may benefit from receiving the forwarded SSR corrections 810.

Figure 9:
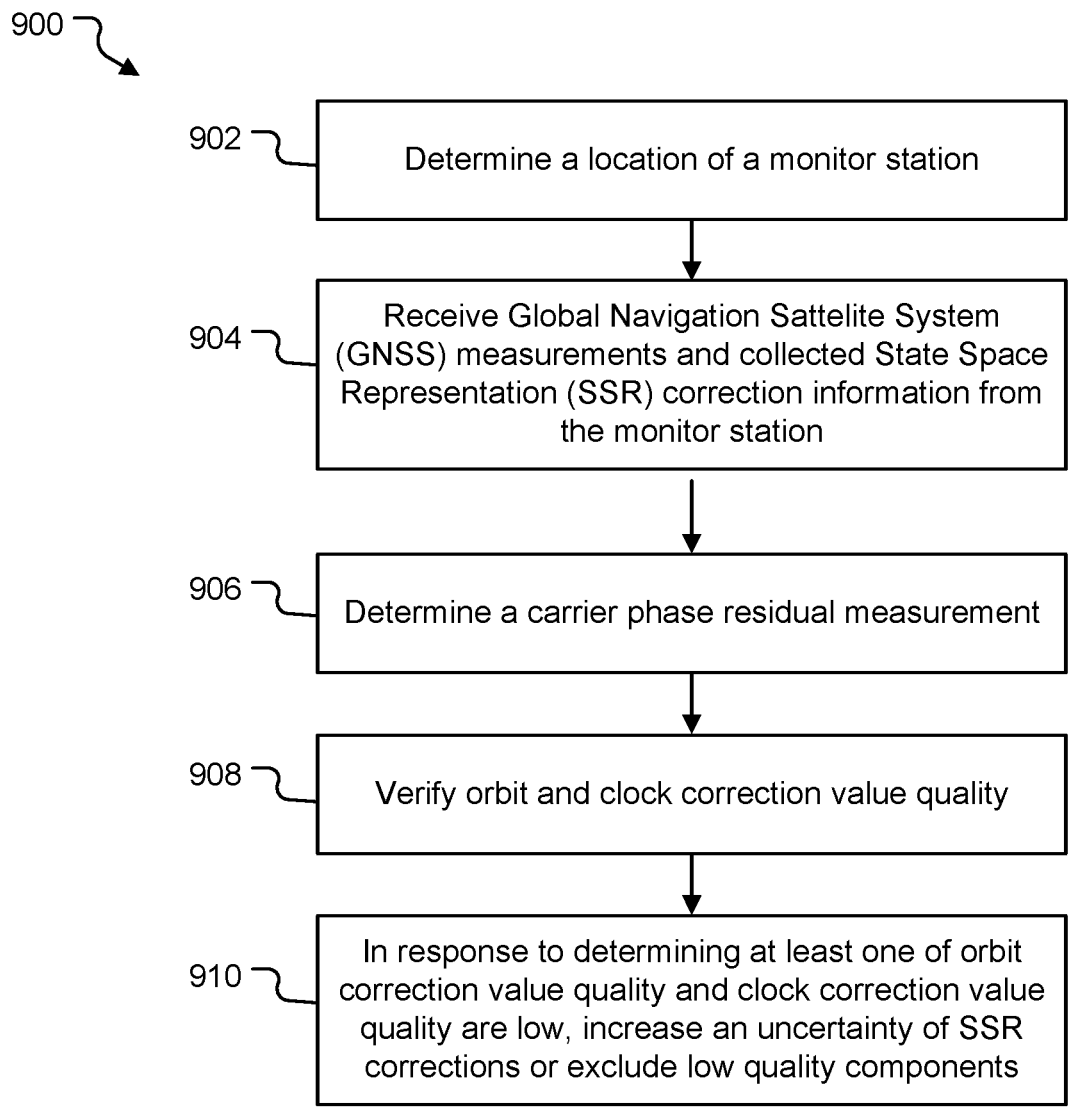
FIG. 9 is a process flow diagram of an example method for verifying a SSR correction quality.

Referring to FIG. 9, with further reference to FIGS. 1-8, a method 900 for verifying SSR correction quality includes the stages shown. The method 900 is, however, an example only and not limiting. The method 900 may be altered, e.g., by having stages added, removed, rearranged, combined, performed concurrently, and/or having single stages split into multiple stages. The method 900 may involve using a GNSS measurement of the monitor station 802 and SSR corrections collected from one or more space vehicles (SV's, which may also be called satellites or satellite vehicles), such as GNSS satellite 704, as well as using the precise, pre-surveyed location of the monitor station 802. The method 900 may be an algorithm, and may be performed by a server 400, such as the networked server 808.

At stage 902, the method includes determining a location of a monitor station. A server 400, including a processor 410 and a transceiver 415 are a means for determining the location of the monitor station. In an example, the monitor station 802 may be a TRP 300 at a known location based on terrestrial positioning techniques (e.g., physical survey) and/or other accurate positioning techniques such as GNSS with PPP and RTK information. Other positioning techniques may also be used to establish the location of the monitor station 802. The networked server 808 may be configured to receive the location information for the monitor station 802 via one or more wired or wireless signaling protocols. For example, the networked server 808 may be communicatively coupled to the communication system 100 and may be configured to receive the location information via LPP/NPP and other data communications connections.

At stage 904, the method includes receiving GNSS measurements and collected SSR correction information from the monitor station. The server 400, including the processor 410 and the transceiver 415 are a means for receiving the GNSS measurements and the SSR correction information. In an example, the monitor station 802 may be configured to obtain tri-band GNSS measurements (e.g., via a GNSS receiver 600 installed at the monitor station 802) and SSR correction information provided by one or more sources (e.g., SVs) in a GNSS constellation. The monitor station 802 may provide the GNSS measurements (e.g., monitor station measurements 806) and the SSR correction information (e.g., SSR correction information 706) to the networked server 808 via known wired and wireless signaling techniques.

At stage 906, the method includes determining a carrier phase residual measurement. The server 400, including the processor 410 and the transceiver 415 are a means for determining the carrier phase residual measurement. In an example, the carrier phase residual may be determined based on tri-band GNSS measurements obtained by the monitor station 802. The networked server 808 may be configured to determine the carrier phase residual. For example, a process for determining the carrier phase residual may include determining a GNSS un-differenced measurement. The un-differenced GNSS pseudo-range and carrier phase measurements can be represented as:

$$P_{Li} = \rho + dT + \delta Orb + \delta Clk + ISTB_{Li} + dTrop + \frac{f_1^2 * dIono}{f_i^2} + \epsilon_{P_{Li}} \quad (1)$$

$$\phi_{Li} = \rho + dT + \delta Orb + \delta Clk + ISTB_{Li} + \quad (2)$$
$$dTrop - \frac{f_1^2 * dIono}{f_i^2} + \lambda_{Li}(N_{Li} + r_{Li} - s_{Li}) + \epsilon_{\phi_{Li}}$$

$$P_{Lj} = \rho + dT + \delta Orb + \delta Clk + ISTB_{Lj} + dTrop + \frac{f_1^2 * dIono}{f_j^2} + \epsilon_{P_{Lj}} \quad (3)$$

$$\phi_{Lj} = \rho + dT + \delta Orb + \delta Clk + ISTB_{Lj} + \quad (4)$$
$$dTrop - \frac{f_1^2 * dIono}{f_j^2} + \lambda_{Lj}(N_{Lj} + r_{Lj} - s_{Lj}) + \epsilon_{\phi_{Lj}}$$

where:
P: pseudorange measurement (m)
Φ: carrier phase measurement (m)
ρ: geometry range (m)
dT: receiver clock (m)
δOrb: satellite orbit error (m)
δClk: satellite clock error (m)
ISTB: inter/intra system/signal time biases (m)
dTrop: troposphere delay residual error after applying the model (m)
dIono: ionosphere delay residual error on L1 band after applying the model (m)
f: central frequency of specified signal band (Hz)
L *: indicator of signal band (L1, L2, L5, etc.)
N: ambiguity integer term (cycle)
r: ambiguity receiver fractional bias term (cycle)
s: ambiguity satellite fractional bias term (cycle)
ϵ: noise and multipath (m)

The central frequency information for different GNSS constellations including GPS, GALILEO and BDS are listed in Table 1 below. The value f0 in the table is 10.23 MHz.

TABLE 1

| GNSS freq ID | GPS | GAL | BDS |
| --- | --- | --- | --- |
| GNSS-L1 | L1 (154*f0) | E1 (154*f0) | B1I (152.6*f0) |
| GNSS-L2 | L2 (120*f0) | E6 (125*f0) | B3 (124*f0) |
| GNSS-L5 | L5 (115*f0) | E5A (115*f0) | B2A (115*f0) |

The process may further include determining a GNSS between-satellite single-differenced measurement. While having two un-differenced measurements from different SVs (e.g. $P_{Li}^{SV,a}$ and $P_{Lj}^{SV,b}$), a between satellite single differencing ($P_{Li}^{SV,b} - P_{Li}^{SV,a}$) can be formed as below:

$$\nabla P_{Li} = \nabla \rho + \nabla \delta Orb + \nabla \delta Clk + \nabla dTrop + \frac{f_1^2 * \nabla dIono}{f_i^2} + \epsilon_{\nabla P_{Li}} \quad (5)$$

$$\nabla \phi_{Li} = \nabla \rho + \nabla \delta Orb + \nabla \delta Clk + \quad (6)$$
$$\nabla dTrop - \frac{f_1^2 * \nabla dIono}{f_i^2} + \lambda_{Li}(\nabla N_{Li} - \nabla s_{Li}) + \epsilon_{\nabla \phi_{Li}}$$

$$\nabla P_{Lj} = \nabla \rho + \nabla \delta Orb + \nabla \delta Clk + \nabla dTrop + \frac{f_1^2 * \nabla dIono}{f_j^2} + \epsilon_{\nabla \phi_{Lj}} \quad (7)$$

$$\nabla \phi_{Lj} = \nabla \rho + \nabla \delta Orb + \nabla \delta Clk + \quad (8)$$
$$\nabla dTrop - \frac{f_1^2 * \nabla dIono}{f_j^2} + \lambda_{Lj}(\nabla N_{Lj} - \nabla s_{Lj}) + \epsilon_{\nabla \phi_{Lj}}$$

where,
∇ is the between satellite single differencing operator.
Here, receiver clock, ISTB, and ambiguity receiver fractional bias terms are canceled out.

The process may further includes determining a wide-lane (WL) carrier phase linear combination. For two carrier phase measurements at different frequency bands $\Phi_{Li}$ and $\Phi_{Lj}$, a wide-lane linear combination $\Phi_{WL}$ can be formed as below:

$$\Phi_{WL} = \frac{f_i}{f_i - f_j}\Phi_{Li} - \frac{f_j}{f_i - f_j}\Phi_{Lj} = \nabla \Delta \rho + \lambda_{WL} \cdot \nabla \Delta N_{WL} + \epsilon_{\nabla \Delta \Phi_{WL}} \quad (9)$$

For the between-satellite single-differenced carrier phases $\nabla \Phi_{Li}$ and $\nabla \Phi_{Lj}$, their wide-lane combination can be expressed as:

$$\nabla \Phi_{WL} = \frac{f_i}{f_i - f_j}\nabla \Phi_{Li} - \frac{f_j}{f_i - f_j}\nabla \Phi_{Lj} \quad (10)$$

$$= \nabla \rho + \nabla \delta Orb + \nabla \delta Clk + \nabla dTrop + \quad (11)$$
$$\frac{f_1^2 \nabla dIono}{f_i f_j} + \lambda_{WL}(\nabla N_{WL} - \nabla s_{WL}) + \epsilon_{\nabla \Delta \Phi_{WL}}$$

in which:

$$\lambda_{WL} = \frac{c}{f_i - f_j} \quad (12)$$

cwhere, is the speed of light (m/s).

The integer ambiguity of such wide-lane measurement has the mapping relationship with the ambiguities of individual bands of:

$$N_{WL} = N_{Li} - N_{Lj} \quad (13)$$

The measurement noise level of such wide-lane measurement has the scaled relationship with that of the individual band measurement of:

$$\epsilon_{\Phi_{WL}} = NS * \epsilon_{\Phi_{Li}} \quad (14)$$

if it is assumed that:

$$\epsilon_{\Phi_{Li}} \approx \epsilon_{\Phi_{Lj}} \quad (15)$$

$$NS = \sqrt{\left(\frac{f_i}{f_i - f_j}\right)^2 + \left(\frac{f_i}{f_i - f_j}\right)^2} \quad (16)$$

The process may further considering two types of wide-lane carrier phase linear combinations while tri-band signal is available. While tri-band signals are available, two types of wide-lane carrier phase measurements can be formed, namely $\Phi_{WL_{L1,L2}}$ and $\Phi_{WL_{L2,L5}}$, based on the equations above.

The process may further include determining special ionosphere-free combination from two WL carrier phases. By using the dispersive property of ionosphere effect, tri-band ionosphere-free carrier phase measurement may be formed by using the two wide-lane carrier phase measurements discussed above:

$$\nabla \phi_{IF(WL_{L1,L2},WL_{L2,L5})} = \quad (17)$$

$$\frac{\frac{f_2}{f_1}}{\frac{f_2}{f_1} - \frac{f_2 f_5}{f_1^2}} \nabla \phi_{WL_{L1,L2}} - \frac{\frac{f_2 f_5}{f_1^2}}{\frac{f_2}{f_1} - \frac{f_2 f_5}{f_1^2}} \nabla \phi_{WL_{L2,L5}} = \nabla \rho + \nabla \delta Orb +$$

$$\nabla \delta Clk + \nabla \delta dTrop + \frac{f_1}{f_1 - f_5} \lambda_{WL_{L1,L2}} \cdot \left(\nabla N_{WL_{L1,L2}} - \nabla s_{WL_{L1,L2}}\right) -$$

$$\frac{f_5}{f_1 - f_5} \lambda_{WL_{L2,L5}} \cdot \left(\nabla N_{WL_{L2,L5}} - \nabla s_{WL_{L2,L5}}\right) + \epsilon$$

where;
- $\nabla$: between satellite differential operator
- $\Phi_{IF(WL_{L1,L2}, WL_{L2,L5})}$: tri-band ionosphere-free carrier phase measurement
- $f_j$: central frequency of Li-band, Li can be L1, L2 or L5
- $\Phi_{WL_{L1,L2}}$: dual-band wide-lane carrier phase measurement formed by L1 and L2
- $\Phi_{WL_{L2,L5}}$: dual-band wide-lane carrier phase measurement formed by L2 and L5
- $\rho$: geometry distance
- $\delta Orb$: orbit error
- $\delta Clk$: clock error
- $dTrop$: troposphere error
- $\lambda_{WL}$: wide-lane combination measurement wavelengths
- $N_{WL}$: wide-lane combination integer ambiguities
- $S_{WL}$: wide-lane ambiguity satellite fractional bias
- $\epsilon$: noise and multipath error The phase residual as a quality indicator may be generated. The residual of the tri-band ionosphere-free carrier phase may be used to verify the orbit and clock quality. The residual may be computed based at least in part on:
- At the monitor station, the device location is precisely known; therefore, the geometry term $\nabla \rho$ may be computed.
- In normal cases, the troposphere delay may be accurately modeled and therefore, the $\nabla dTrop$ may be assumed to be negligible.
- The wide-lane ambiguity satellite fractional bias has the property of long-term stability, and thus $\nabla S_{WL}$ may be pre-determined.
- $\nabla N_{WL_{L2,L5}}$ may be resolved through a geometry-free approach between the differential between narrow-lane pseudo-range and wide-lane carrier phase.

The phase residual may be computed as:

$$\text{Residual} = \quad (18)$$

$$\nabla \Phi_{IF(WL_{L1,L2},WL_{L2,L5})} - \left(\nabla \rho + \nabla dTrop + \frac{f_1}{f_1 - f_5} \lambda_{WL_{L1,L2}} \cdot \nabla s_{WL_{L1,L2}} + \right.$$

$$\left. \frac{f_5}{f_1 - f_5} \lambda_{WL_{L2,L5}} \cdot \left(\nabla N_{WL_{L2,L5}} - \nabla s_{WL_{L2,L5}}\right)\right) =$$

$$\nabla \delta Orb + \nabla \delta Clk + \frac{f_1}{f_1 - f_5} \lambda_{WL_{L1,L2}} \cdot \nabla N_{WL_{L1,L2}}$$

The effective wavelength of such residual is:

$$\frac{f_1}{f_1 - f_5} \lambda_{WL_{L1,L2}}. \quad (19)$$

In normal cases, because the magnitude of $\nabla \delta Orb$ and $\nabla \delta Clk$ are close to zero, the residual converted in cycle will be close to an integer:

$$\frac{\text{Residual}}{\frac{f_1}{f_1 - f_5} \lambda_{WL_{L1,L2}}} \approx \nabla N_{WL_{L1,L2}} \quad (20)$$

But when the SSR orbit/clock correction has a quality issue, the residual will not be close to an integer; therefore the below value can be a quantified indicator (QI) to evaluate the orbit/clock quality:

$$QI = \frac{\text{Residual}}{\frac{f}{f_1 - f_5} \lambda_{WL_{L1,L2}}} - \left\langle \frac{\text{Residual}}{\frac{f_1}{f_1 - f_5} \lambda_{WL_{L1,L2}}} \right\rangle \quad (21)$$

where < ... > is rounding operator.

At stage 908, the method includes verifying orbit and clock correction value quality. The server 400, including the processor 410 and the transceiver 415 are a means for verifying the orbit and clock correction quality. In an example, referring to equations (20) and (21), the networked server 808 may be configured to compute the orbit/clock correction quality.

At stage 910, the method includes, in response to determining at least one of the orbit correction value quality and clock correction value quality are low, increasing an uncertainty of the SSR corrections or excluding low quality components of the SSR corrections. The server 400, including the processor 410 and the transceiver 415 are a means for increasing the uncertainty or excluding the low quality components. In an example, the uncertainty and/or exclusion may be based on the QI value as described above. The forwarded SSR corrections 810 may include an indication of the uncertainty and/or they may be provided without the low quality components.

Figure 10:
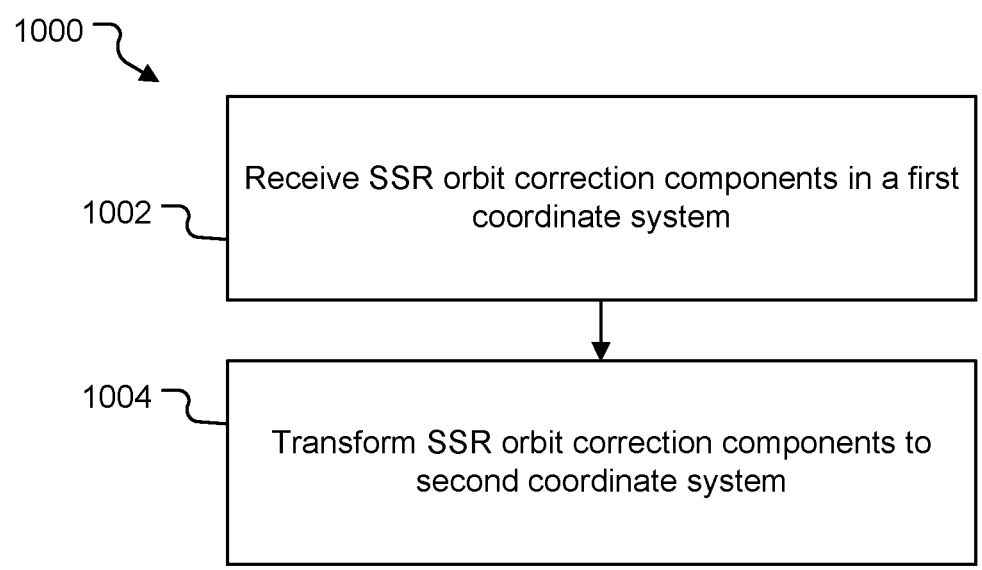
FIG. 10 is a process flow diagram of an example method for transforming SSR correction components.

Referring to FIG. 10, with further reference to FIGS. 1-9, a method 1000 for transforming SSR correction components includes the stages shown. The method 1000 is, however, an example only and not limiting. The method 1000 may be altered, e.g., by having stages added, removed, rearranged, combined, performed concurrently, and/or having single stages split into multiple stages.

At stage 1002, the method includes receiving SSR orbit correction components in a first coordinate system. A server 400, including a processor 410 and a transceiver 415, is a means for receiving the SSR orbit correction components. In an example, the SSR orbit correction components may be received in radial, along-track, and cross-track (RAC) coordinates. A UE may need to convert the RAC coordinates to another coordinate system to perform a requested positioning estimate. The coordinate conversion may utilize scarce processing capabilities on the UE and thus receiving SSR orbit correction components in another format may improve computational efficiency on the UE. The SSR orbit correction components based on other coordinate systems may also be received and transformed based on the capabilities of a subscribing device.

At stage 1004, the method includes transforming the SSR orbit correction components to a second coordinate system. The server 400, including the processor 410, is a means for transforming the SSR orbit correction components. In an example, the server 400 may be configured to transform the SSR orbit correction components from the RAC coordinates (e.g., the first coordinate system) to a Cartesian (e.g., X, Y, Z) coordinate system (e.g., the second coordinate system). The configuration of the second coordinate system may be based on the capabilities of a mobile device configured to utilize the SSR orbit correction components to generate a position estimate.

Figure 11:
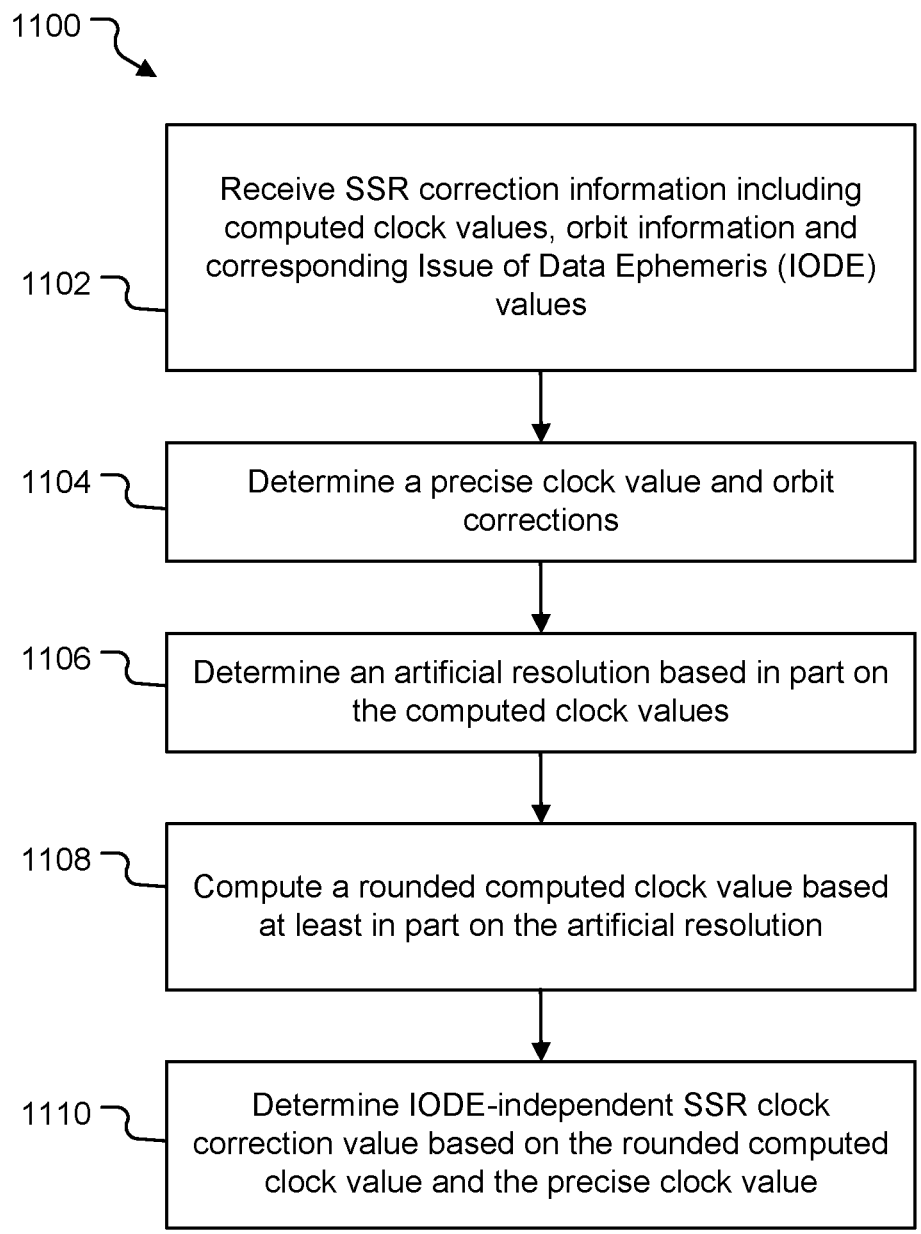
FIG. 11 is a process flow diagram of an example method for removing Issue of Data Ephemeris (IODE) dependency from SSR correction information.

Referring to FIG. 11, with further reference to FIGS. 1-9, a method 1100 for normalizing SSR correction data by removing IODE dependency includes the stages shown. The method 1100 is, however, an example only and not limiting. The method 1100 may be altered, e.g., by having stages added, removed, rearranged, combined, performed concurrently, and/or having single stages split into multiple stages. The SSR clock correction information received by the monitor station 802 may typically include a corresponding IODE value, which acts as an indicator for the temporary validity of the SSR corrections. IODE-dependent SSR clock corrections require a receiving device (e.g., the UE 702, OBU 500) to have the most current IODE value in order to apply the proper correction to the broadcast clock, which enables determining the precise clock, which is necessary for more accurate location determination. If a receiving device does not have the most current IODE, the IODE-dependent SSR clock correction may be unusable by that device. IODE-independent SSR clock corrections, however, can be utilized by devices that do not have the correct IODE.

At stage 1102, the process includes receiving SSR correction information including computed clock values, orbit information, and corresponding IODE values. A server 400, including a processor 410 and a transceiver 415, is a means for receiving the SSR correction information. In an example, the monitor station 802 forwards the SSR correction information 706 including the computed clock values, and the corresponding IODE values to the networked server 808.

At stage 1104, the method includes determining a precise clock value and orbit corrections. The server 400, including the processor 410 and the transceiver 415, is a means for determining the precise clock value and orbit corrections. The networked server 808 may be configured to determine the precise clock value and orbit corrections based on the computed clock values and the corresponding IODE value. In an example, the SSR correction information may include a standard SSR clock correction value based on the IODE value. The standard SSR clock correction value may be applied to the computed clock values which are associated with the same IODE value.

At stage 1106, the method includes determining an artificial resolution based in part on the computed clock values. The server 400, including the processor 410 and the transceiver 415, is a means for determining the artificial resolution. In an example, the networked server 808 may receive computed clock values associated with multiple IODEs (e.g., IODE-1, IODE-2, etc.), with each IODE having a standard clock correction value. The networked server 808 may be configured to round the computed clock values down to the nearest increment that is common to the clock values associated with each of the multiple IODEs. The nearest increment may be based on an integer value for the computed clock values (e.g., 1 m, 2 m, 5 m, 10 m, etc. increments). The value of the nearest increment is the artificial resolution.

At stage 1108, the process includes computing a rounded computed clock value based at least in part on the artificial resolution. The server 400, including the processor 410, is a means for computing a rounded computed clock value. The networked server 808 may be configured to utilize the artificial resolution to compute the rounded down computed clock values. For example, if a first computed clock value is 1438.1, which is associated with a first IODE, and a second computed clock value is 1436.1, which is associated with a second IODE, the nearest 5 m increment may be 1435. The first computed clock value and the second computed clock value may each be rounded down to 1435.

At stage 1110, the method includes determining an IODE-independent SSR clock correction value based on the rounded computed clock value and the precise clock value. The server 400, including the processor 410, is a means for determining the IODE-independent SSR clock correction value. The networked server 808 may be configured to determine the IODE-independent SSR clock correction value by subtracting the rounded computed clock value from the precise clock value. In the previous example, if a first precise clock value is 1437.9 (e.g., associated with the first IODE), and the first rounded computed clock value is 1435, the IODE-independent SSR clock correction value will be 2.9. The IODE-independent SSR clock correction value will be usable by devices which compute the same rounded broadcast computed clock value. Continuing the example, a device that is using the second computed clock value of 1436.4, which is based on the second IODE, may be configured to compute the same rounded computed clock value of 1435. Thus, even if this device does not have the most current IODE value, the IODE-independent SSR clock correction value will be applicable and the device can determine the same precise clock value of 1437.9 by adding 2.9 to its rounded broadcast computed clock value of 1435. In operation, the networked server 808 may be configured to send the artificial resolution and the IODE-independent SSR clock correction to the UE 702, enabling the UE 702 to determine the precise clock value, regardless of whether the UE 702 has the current IODE value.

Figure 12:
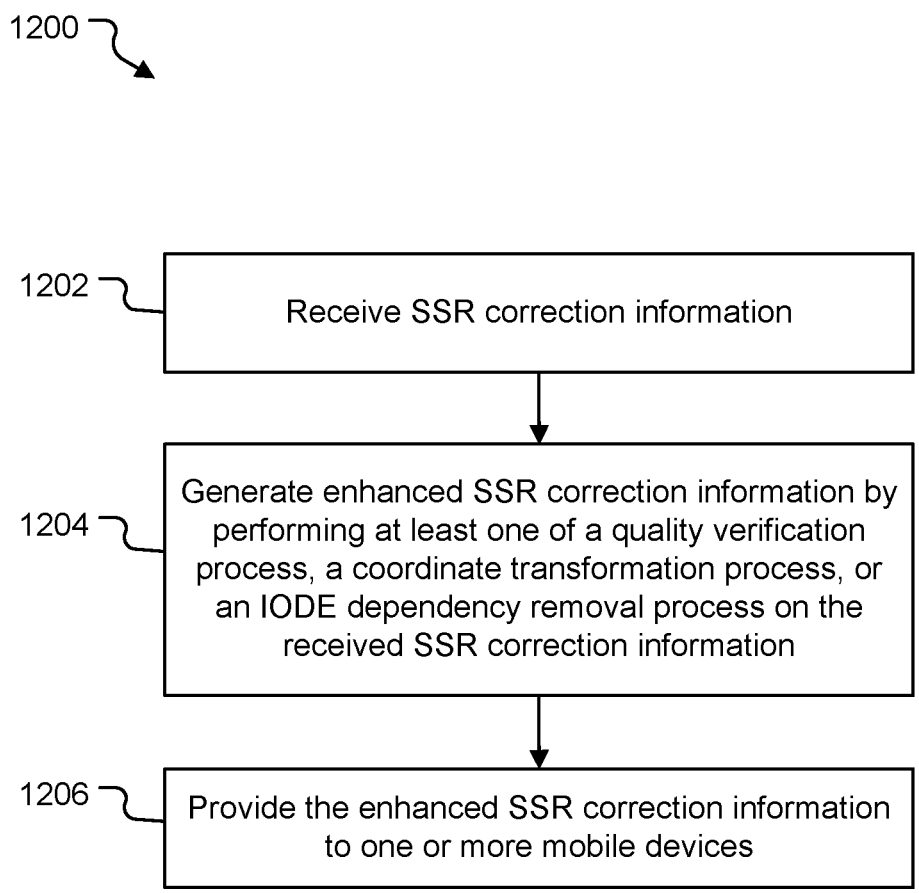
FIG. 12 is a process flow diagram of an example method for providing SSR correction information.

Referring to FIG. 12, with further reference to FIGS. 1-9, a method 1200 for providing SSR correction information includes the stages shown. The method 1200 is, however, an example only and not limiting. The method 1200 may be altered, e.g., by having stages added, removed, rearranged, combined, performed concurrently, and/or having single stages split into multiple stages.

At stage 1202, the method includes receiving SSR correction information. A server 400, including a processor 410 and a transceiver 415, is a means for receiving the SSR correction information. The SSR correction information may be provided to the monitor station 802 by one or more GNSS satellites 704. The SSR information may include ephemeris information (e.g., and associated clock and IODE information). The monitor station 802 may typically be located in a fixed and known location, and may be configured to send the SSR correction information 706 and additional monitor station measurements 806 to the networked server 808. In an example, the SSR correction information may include the monitor station measurements 806 based on GNSS-measured location information of the monitor station 802 and precise location information of the monitor station 802.

At stage 1204, the method includes generating enhanced SSR correction information by performing at least one of a quality verification process, a coordinate transformation process, or an IODE dependency removal process on the received SSR correction information. The server 400, including the processor 410, is a means for generating the enhanced SSR correction information. In an example, the networked server 808 may be configured to perform a quality verification process such as described in FIG. 9. In an example, the networked server 808 may be configured to perform a coordinate transformation process such as described in FIG. 10. In an example, the networked server 808 may be configured to perform a IODE dependency removal process such as described in FIG. 11. The networked server 808 may be configured to perform various combinations of the quality verification process, the coordinate transformation process, and the IODE dependency removal process on the received SSR correction information. In an example, the networked server 808 may be configured to perform each of the quality verification process, the coordinate transformation process, and the IODE dependency removal process on the received SSR correction information. The enhanced SSR correction information may be based on a subscriber level of a mobile device such that the mobile device may receive some or all of the enhancements based on a subscription service (e.g., contract).

At stage 1206, the method includes providing the enhanced SSR correction information to one or more mobile devices. The server 400, including the processor 410 and the transceiver 415, is a means for providing the enhanced SSR correction information. In an example, the networked server 808 may utilized the communication system 100 to provide the enhanced SSR correction information to mobile devices. Other signaling techniques may be used. For example, local over-the-air signaling (e.g., outside of a cellular network) may be utilized to provide the enhanced SSR correction information to devices within a coverage area Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which at least some communications are conveyed wirelessly, e.g., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media.

Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected, coupled (e.g., communicatively coupled), or communicating with each other are operably coupled. That is, they may be directly or indirectly, wired and/or wirelessly, connected to enable signal transmission between them.

Having described several example configurations, various modifications, alternative constructions, and equivalents may be used without departing from the scope of the disclosure. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

"About" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

Implementation examples are described in the following numbered clauses:

Clause 1. A method for providing Global Navigation Satellite System (GNSS) State Space Representation (SSR) correction information, comprising: receiving SSR correction information; generating enhanced SSR correction information by performing at least one of a quality verification process, a coordinate transformation process, or an Issue of Data Ephemeris (IODE) dependency removal process on the received SSR correction information; and providing the enhanced SSR correction information to one or more mobile devices.

Clause 2. The method of clause 1 wherein the SSR correction information is received from a stationary monitor station configured to receive the SSR correction information from one or more satellite vehicles.

Clause 3. The method of clause 1 wherein the SSR correction information includes a computed clock value, orbit information, an indication of an associated IODE value, or combinations thereof.

Clause 4. The method of clause 3 wherein the enhanced SSR correction information includes a rounded computed clock value based on a rounding down of the computed clock value to an integer value, and a clock correction value that is not dependent on a IODE.

Clause 5. The method of clause 1 wherein the SSR correction information includes one or more orbit correction components based on a radial, along-track, and cross-track coordinate system.

Clause 6. The method of clause 5 wherein the enhanced SSR correction information includes Cartesian coordinate for the one or more orbit correction components.

Clause 7. The method of clause 1 wherein the quality verification process includes determining a carrier phase residual measurement associated with orbit information and clock information included in the SSR correction information.

Clause 8. The method of clause 7 wherein the quality verification process includes excluding the orbit information and the clock information from the enhanced SSR correction information based at least in part on the carrier phase residual measurement.

Clause 9. The method of clause 1 wherein providing the enhanced SSR correction information to a mobile device is based at least in part on a subscription service associated with the mobile device.

Clause 10. An apparatus, comprising: a memory; at least one transceiver; at least one processor communicatively coupled to the memory and the at least one transceiver, and configured to: receive Global Navigation Satellite System (GNSS) State Space Representation (SSR) correction information; generate enhanced SSR correction information by performing at least one of a quality verification process, a coordinate transformation process, or an Issue of Data Ephemeris (IODE) dependency removal process on the received SSR correction information; and provide the enhanced SSR correction information to one or more mobile devices.

Clause 11. The apparatus of clause 10 wherein the at least one processor is further configured to receive the SSR correction information from a stationary monitor station configured to receive the SSR correction information from one or more satellite vehicles.

Clause 12. The apparatus of clause 10 wherein the SSR correction information includes a computed clock value, orbit information, an indication of an associated IODE value, or combinations thereof.

Clause 13. The apparatus of clause 12 wherein the enhanced SSR correction information includes a rounded computed clock value based on a rounding down of the computed clock value to an integer value, and a clock correction value that is not dependent on a IODE.

Clause 14. The apparatus of clause 10 wherein the SSR correction information includes one or more orbit correction components based on a radial, along-track, and cross-track coordinate system.

Clause 15. The apparatus of clause 14 wherein the enhanced SSR correction information includes Cartesian coordinate for the one or more orbit correction components.

Clause 16. The apparatus of clause 10 wherein the at least one processor is further configured to determine a carrier phase residual measurement associated with orbit information and clock information included in the SSR correction information.

Clause 17. The apparatus of clause 16 wherein the at least one processor is further configured to exclude the orbit information and the clock information from the enhanced SSR correction information based at least in part on the carrier phase residual measurement.

Clause 18. The apparatus of clause 10 wherein the at least one processor is further configured to provide the enhanced SSR correction information to a mobile device is based at least in part on a subscription service associated with the mobile device.

Clause 19. An apparatus for providing Global Navigation Satellite System (GNSS) State Space Representation (SSR) correction information, comprising: means for receiving SSR correction information; means for generating enhanced SSR correction information by performing at least one of a quality verification process, a coordinate transformation process, or an Issue of Data Ephemeris (IODE) dependency removal process on the received SSR correction information; and means for providing the enhanced SSR correction information to one or more mobile devices.

Clause 20. The apparatus of clause 19 wherein the SSR correction information is received from a stationary monitor station configured to receive the SSR correction information from one or more satellite vehicles.

Clause 21. The apparatus of clause 19 wherein the SSR correction information includes a computed clock value, orbit information, an indication of an associated IODE value, or combinations thereof.

Clause 22. The apparatus of clause 21 wherein the enhanced SSR correction information includes a rounded computed clock value based on a rounding down of the computed clock value to an integer value, and a clock correction value that is not dependent on a IODE.

Clause 23. The apparatus of clause 19 wherein the SSR correction information includes one or more orbit correction components based on a radial, along-track, and cross-track coordinate system.

Clause 24. The apparatus of clause 23 wherein the enhanced SSR correction information includes Cartesian coordinate for the one or more orbit correction components.

Clause 25. The apparatus of clause 19 wherein the quality verification process includes means for determining a carrier phase residual measurement associated with orbit information and clock information included in the SSR correction information.

Clause 26. The apparatus of clause 25 wherein the quality verification process includes excluding the orbit information and the clock information from the enhanced SSR correction information based at least in part on the carrier phase residual measurement.

Clause 27. The apparatus of clause 19 wherein providing the enhanced SSR correction information to a mobile device is based at least in part on a subscription service associated with the mobile device.

Clause 28. A non-transitory processor-readable storage medium comprising processor-readable instructions configured to cause one or more processors to forward Global Navigation Satellite System (GNSS) State Space Representation (SSR) correction information, comprising: code for receiving SSR correction information; code for generating enhanced SSR correction information by performing at least one of a quality verification process, a coordinate transformation process, or an Issue of Data Ephemeris (IODE) dependency removal process on the received SSR correction information; and code for providing the enhanced SSR correction information to one or more mobile devices.

Clause 29. The non-transitory processor-readable storage medium of clause 28 wherein the SSR correction information is received from a stationary monitor station configured to receive the SSR correction information from one or more satellite vehicles.

Clause 30. The non-transitory processor-readable storage medium of clause 28 wherein the SSR correction information includes a computed clock value, orbit information, an indication of an associated IODE value, or combinations thereof.

Clause 31. The non-transitory processor-readable storage medium of clause 30 wherein the enhanced SSR correction information includes a rounded computed clock value based on a rounding down of the computed clock value to an integer value, and a clock correction value that is not dependent on a IODE.

Clause 32. The non-transitory processor-readable storage medium of clause 28 wherein the SSR correction information includes one or more orbit correction components based on a radial, along-track, and cross-track coordinate system.

Clause 33. The non-transitory processor-readable storage medium of clause 32 wherein the enhanced SSR correction information includes Cartesian coordinate for the one or more orbit correction components.

Clause 34. The non-transitory processor-readable storage medium of clause 33 wherein the quality verification process includes code for determining a carrier phase residual measurement associated with orbit information and clock information included in the SSR correction information.

Clause 35. The non-transitory processor-readable storage medium of clause 34 wherein the quality verification process includes code for excluding the orbit information and the clock information from the enhanced SSR correction information based at least in part on the carrier phase residual measurement.

Clause 36. The non-transitory processor-readable storage medium of clause 28 wherein providing the enhanced SSR correction information to a mobile device is based at least in part on a subscription service associated with the mobile device.

The invention claimed is:

1. A method for providing Global Navigation Satellite System (GNSS) State Space Representation (SSR) correction information, comprising:
   receiving SSR correction information;
   generating enhanced SSR correction information by performing a quality verification process on the SSR correction information, wherein the quality verification process comprises determining a carrier phase residual measurement associated with orbit information and clock information included in the SSR correction information, and excluding the orbit information and the clock information from the enhanced SSR correction information based at least in part on the carrier phase residual measurement; and
   providing the enhanced SSR correction information to one or more mobile devices.

2. The method of claim 1 wherein the SSR correction information is received from a stationary monitor station configured to receive the SSR correction information from one or more satellite vehicles.

3. The method of claim 1 wherein the SSR correction information includes a computed clock value, orbit information, an indication of an associated IODE value, or combinations thereof.

4. The method of claim 3 wherein the enhanced SSR correction information includes a rounded computed clock value based on a rounding down of the computed clock value to an integer value, and a clock correction value that is not dependent on an IODE.

5. The method of claim 1 wherein the SSR correction information includes one or more orbit correction components based on a radial, along-track, and cross-track coordinate system.

6. The method of claim 5 wherein the enhanced SSR correction information includes Cartesian coordinate for the one or more orbit correction components.

7. The method of claim 1 wherein providing the enhanced SSR correction information to a mobile device is based at least in part on a subscription service associated with the mobile device.

8. An apparatus, comprising:
   a memory;
   at least one transceiver;
   at least one processor communicatively coupled to the memory and the at least one transceiver, and configured to:
      receive Global Navigation Satellite System (GNSS) State Space Representation (SSR) correction information;
      generate enhanced SSR correction information by performing a quality verification process on the SSR correction information, wherein the quality verification process comprises determining a carrier phase residual measurement associated with orbit information and clock information included in the SSR correction information, and excluding the orbit information and the clock information from the enhanced SSR correction information based at least in part on the carrier phase residual measurement on the received SSR correction information; and
      provide the enhanced SSR correction information to one or more mobile devices.

9. The apparatus of claim 8 wherein the at least one processor is further configured to receive the SSR correction information from a stationary monitor station configured to receive the SSR correction information from one or more satellite vehicles.

10. The apparatus of claim 8 wherein the SSR correction information includes a computed clock value, orbit information, an indication of an associated IODE value, or combinations thereof.

11. The apparatus of claim 10 wherein the enhanced SSR correction information includes a rounded computed clock value based on a rounding down of the computed clock value to an integer value, and a clock correction value that is not dependent on an IODE.

12. The apparatus of claim 8 wherein the SSR correction information includes one or more orbit correction components based on a radial, along-track, and cross-track coordinate system.

13. The apparatus of claim 12 wherein the enhanced SSR correction information includes Cartesian coordinate for the one or more orbit correction components.

14. The apparatus of claim 8 wherein the at least one processor is further configured to provide the enhanced SSR correction information to a mobile device is based at least in part on a subscription service associated with the mobile device.

15. An apparatus for providing Global Navigation Satellite System (GNSS) State Space Representation (SSR) correction information, comprising:
   means for receiving SSR correction information;
   means for generating enhanced SSR correction information by performing of a quality verification process on the SSR correction information, wherein the quality verification process comprises means for determining a carrier phase residual measurement associated with orbit information and clock information included in the SSR correction information, and means for excluding the orbit information and the clock information from the enhanced SSR correction information based at least in part on the carrier phase residual measurement; and
   means for providing the enhanced SSR correction information to one or more mobile devices.

16. The apparatus of claim 15 wherein the SSR correction information is received from a stationary monitor station configured to receive the SSR correction information from one or more satellite vehicles.

17. The apparatus of claim 15 wherein the SSR correction information includes a computed clock value, orbit information, an indication of an associated IODE value, or combinations thereof.

18. The apparatus of claim 17 wherein the enhanced SSR correction information includes a rounded computed clock value based on a rounding down of the computed clock value to an integer value, and a clock correction value that is not dependent on an IODE.

19. The apparatus of claim 15 wherein the SSR correction information includes one or more orbit correction components based on a radial, along-track, and cross-track coordinate system.

20. The apparatus of claim 19 wherein the enhanced SSR correction information includes Cartesian coordinate for the one or more orbit correction components.

21. The apparatus of claim 15 wherein providing the enhanced SSR correction information to a mobile device is based at least in part on a subscription service associated with the mobile device.

22. A non-transitory processor-readable storage medium comprising processor-readable instructions configured to cause one or more processors to forward Global Navigation Satellite System (GNSS) State Space Representation (SSR) correction information, comprising:
 code for receiving SSR correction information;
 code for generating enhanced SSR correction information by performing a quality verification process on the SSR correction information, wherein the quality verification process comprises code for determining a carrier phase residual measurement associated with orbit information and clock information included in the SSR correction information, and code for excluding the orbit information and the clock information from the enhanced SSR correction information based at least in part on the carrier phase residual measurement; and
 code for providing the enhanced SSR correction information to one or more mobile devices.

23. The non-transitory processor-readable storage medium of claim 22 wherein the SSR correction information includes a computed clock value, orbit information, an indication of an associated IODE value, or combinations thereof.

24. The non-transitory processor-readable storage medium of claim 22 wherein providing the enhanced SSR correction information to a mobile device is based at least in part on a subscription service associated with the mobile device.

* * * * *